Patented Aug. 28, 1945

2,383,564

UNITED STATES PATENT OFFICE 2,383,564

INSECTICIDAL COMPOSITIONS

Anderson W. Ralston, John P. Barrett, and Miles R. McCorkle, Chicago, Ill., assignors to Armour and Company, Chicago, Ill., a corporation of Illinois No Drawing. Application August 16, 1941,
Serial No. 407,222

6 Claims. (Cl. 167—22)

This invention relates to insecticides, and it comprises an insecticide containing a β-hydroxyethylamine having the formula

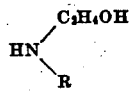

wherein R is an aliphatic hydrocarbon having at least six carbon atoms.

There are two general types of insecticides. The first consists of the so-called stomach poisons which are effective only when consumed by the insect. Calcium arsenate and lead arsenate are typical compounds of this class. These substances are, however, quite toxic to humans but are, nevertheless, used in large quantities for the control of leaf-eating insects. The second type of insecticides functions as a respiratory paralyzing agent. These substances are lethal on contact and are thus generally referred to as contact insecticides.

We have now discovered a class of chemical compounds which have high insecticidal power and in addition are non-toxic and non-irritating to humans and to domestic animals, as well as having no undesirable reaction on vegetation to which the insecticide is applied for the control of leaf-eating insects.

Our new insecticidal compounds can be generically described as β-hydroxyethylamines having the formula

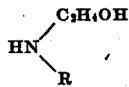

in which R is an aliphatic hydrocarbon radical having at least six carbon atoms. These substances are thus secondary aliphatic amines in which one of the hydrogen substituents is the β-hydroxyethyl radical and the other substituent is an aliphatic hydrocarbon radical having at least six carbon atoms. The hydrocarbon radical can thus be hexyl, octyl, nonyl, decyl, dodecyl, undecyl, tridecyl, hexadecyl and octadecyl, and the corresponding alkylene radicals. These compounds are soluble in many organic solvents and organic solutions thereof can be sprayed or otherwise applied. One of the most convenient solvents for use is kerosene. A plant spray is conveniently prepared by emulsifying the amine in water by the use of any suitable emulsifying agent, such as soap. Such emulsions are especially useful as general agricultural sprays, as well as for the control of insects in animal husbandry. The amines of our invention can be incorporated in dusting powders to give compositions composed of any suitable inert finely divided solid, such as talc, and the amine.

All of the amines we use can be prepared readily by reacting ethylene chlorhydrin with the appropriate primary aliphatic amine. For example β-hydroxyethyldodecylamine is prepared by heating a mixture of ethylene chlorhydrin and dodecylamine and recovering the β-hydroxyethyldodecylamine from the reaction product. We make no claim to any novelty in ways of preparing the amines.

We have tested the efficacy of our insecticides for controlling roaches, flies, moths, beetles and plant lice. The following is a description of the method of obtaining test flies and the procedure used in determining the usefulness of these amines for the control of flies.

Our breeding stock is obtained from wild house flies. The flies are placed in breeding cages and fed milk, and eggs are placed in Richardson's medium (Science 76, 350-1, 1932). Five to six hundred eggs from the breeding colony are then placed in one gallon jars containing about 120 cu. in. of Richardson's medium. The jars are covered with cheesecloth and kept at 74–78° F. and 53–58 percent relative humidity. After development the pupae are separated from the medium and placed in cages for emergence. The entire process takes about thirteen days. Approximately six hundred pupae are placed in each test cage. The test sprayings are made five days from the date when most of the flies emerge. The cage containing the flies is placed in a spraying chamber and the insecticidal solution sprayed into the chamber with a De Vilbiss atomizer No. 16 at a constant pressure of four pounds. The test cage containing the flies is left in the spraying chamber for ten minutes after spraying. Under our conditions of spraying we found it necessary to use 38 cc. of the National Association of Insecticide and Disinfectant Manufacturers Official Test Insecticide to obtain the recommended kill of 50 to 60 percent. After removal of the cage from the spraying chamber the flies knocked down are counted, and after chilling all flies were transferred to a clean cage. The dead flies are counted after twenty-four hours or in some cases after forty-eight hours. It will be noted that those flies able to fly after spraying are observed for a twenty-four hour period as our experience shows that many such flies die during the subsequent twenty-four hours.

Table 1 shows the results are obtained when β-hydroxyethyloctylamine and β-hydroxyethyldodecylamine, either alone or mixed with pyrethrum, are sprayed under the above test conditions. Flies were employed as the test insect and a highly refined kerosene as the solvent. The pyrethrum extract used contained 2.5 grams of pyrethrins per 100 cc.

TABLE 1

*Insecticidal properties of β-hydroxyethyl-alkyl derivatives*

| Composition | Per cent knockdown, 10 minutes | Per cent kill, 24 hours |
|---|---|---|
| 5% β-hydroxyethyl-octylamine | 96 | 96 |
| 5% β-hydroxyethyl-dodecylamine | 68 | 81 |
| 2.5% β-hydroxyethyl-octylamine<br>2.5% pyrethrum extract | 99 | 98 |
| 2.5% β-hydroxyethyl-dodecylamine<br>2.5% pyrethrum extract | 98 | 97 |
| 2.5% pyrethrum extract | 92 | 40 |
| Official test insecticide | 98 | 55 |

In the above compositions the percentage of insecticidal material represents the concentration of it in the kerosene.

The table shows that amines used in the present invention possess high paralyzing activity and killing power for flies. The knockdown is not as high as that shown by pyrethrum extracts of comparable concentration, but the lethal effect is materially greater. Mixtures of the amines with pyrethrum show very high activity both as regards percent knockdown and percent kill.

While our experimental work has been done with the amine in solution, these new insecticides can also be used, as heretofore stated, in dusting compositions by adsorbing the lethal mixture on such substances as talc, clays or other inert substances.

Having thus described our invention, what we claim is:

1. A process for treating insect infected areas comprising applying to said areas beta-hydroxyethylalkylamine wherein the alkyl group contains at least six carbon atoms.

2. A process for treating insect infected areas comprising applying to said areas beta-hydroxyethyloctylamine.

3. A process for treating insect infested areas comprising applying to said areas beta-hydroxyethyldodecylamine.

4. An insecticide comprising β-hydroxyethylalkylamine wherein the alkyl group contains at least 6 carbon atoms and kerosene as a carrier therefor.

5. An insecticide comprising a water emulsion of β-hydroxyethylalkylamine wherein the alkyl group contains at least 6 carbon atoms.

6. An insecticide comprising β-hydroxyethylalkylamine wherein the alkyl group contains at least 6 carbon atoms in admixture with an inert powder which serves as a carrier therefor.

ANDERSON W. RALSTON.
JOHN P. BARRETT.
MILES R. McCORKLE.